US011912533B2

(12) United States Patent
Witczak et al.

(10) Patent No.: US 11,912,533 B2
(45) Date of Patent: Feb. 27, 2024

(54) VIBRATION MONITORING BEACON MODE DETECTION AND TRANSITION

(71) Applicant: Otis Elevator Company, Farmington, CT (US)

(72) Inventors: Tadeusz Pawel Witczak, Farmington, CT (US); Craig Drew Bogli, Avon, CT (US); Derk Oscar Pahlke, Berlin (DE); Yrinee Michaelidis, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/114,586

(22) Filed: Feb. 27, 2023

(65) Prior Publication Data

US 2023/0219787 A1 Jul. 13, 2023

Related U.S. Application Data

(62) Division of application No. 16/210,147, filed on Dec. 5, 2018, now Pat. No. 11,613,445.

(51) Int. Cl.
*B66B 5/00* (2006.01)
*B66B 13/02* (2006.01)

(52) U.S. Cl.
CPC .......... *B66B 5/0018* (2013.01); *B66B 5/0037* (2013.01); *B66B 13/02* (2013.01)

(58) Field of Classification Search
CPC ..... B66B 5/0018; B66B 5/0037; B66B 13/02; B66B 5/0025; B66B 5/0031
See application file for complete search history.

(56) References Cited

U.S. PATENT DOCUMENTS 3,688,504 A 9/1972 Hutchinson et al.
4,991,389 A 2/1991 Schafer
(Continued)

FOREIGN PATENT DOCUMENTS

CN 103231962 A 8/2013
CN 103472192 A 12/2013
(Continued)

OTHER PUBLICATIONS

EP Application No. 19213989.7 Extended EP Search Report dated May 12, 2020, 14 pages.
(Continued)

*Primary Examiner* — Jeffrey Donels
(74) *Attorney, Agent, or Firm* — CANTOR COLBURN LLP

(57) ABSTRACT

According to an aspect, a method includes monitoring a plurality of vibration data by a vibration monitoring beacon and determining that the vibration monitoring beacon has been installed at a service location based on detecting an installation characteristic signature in the vibration data. The vibration monitoring beacon can transition into a learning mode based on determining that the vibration monitoring beacon has been installed at the service location. The method can also include monitoring for a learning mode termination event and transitioning the vibration monitoring beacon from the learning mode to a normal operation mode based on detecting the learning mode termination event.

19 Claims, 4 Drawing Sheets

(56) References Cited

U.S. PATENT DOCUMENTS

| | | | | |
|---|---|---|---|---|
| 5,515,673 | A | 5/1996 | Leclerco et al. | |
| 5,602,757 | A * | 2/1997 | Haseley | F04C 28/28 702/56 |
| 5,610,339 | A * | 3/1997 | Haseley | G01H 1/003 702/56 |
| 7,434,666 | B2 | 10/2008 | Tyni et al. | |
| 7,484,598 | B2 | 2/2009 | Tyni et al. | |
| 7,823,706 | B2 | 11/2010 | Tyni et al. | |
| 8,424,279 | B2 | 4/2013 | Rajamani et al. | |
| 8,678,143 | B2 | 3/2014 | Bunter | |
| 9,309,089 | B2 | 4/2016 | Annen et al. | |
| 9,469,503 | B2 | 10/2016 | Bunter | |
| 9,950,899 | B2 | 4/2018 | Mattsson et al. | |
| 10,112,801 | B2 | 10/2018 | Madarasz et al. | |
| 2011/0168496 | A1 | 7/2011 | Bunter | |
| 2014/0109589 | A1 | 4/2014 | Pritchard, Jr. et al. | |
| 2015/0284214 | A1 | 10/2015 | Park et al. | |
| 2017/0121028 | A1 | 5/2017 | Visser et al. | |
| 2018/0156757 | A1* | 6/2018 | Nagrodsky | G01V 1/001 |
| 2018/0252184 | A1 | 9/2018 | Hatim | |
| 2019/0005826 | A1 | 1/2019 | Lax et al. | |
| 2019/0010019 | A1* | 1/2019 | Koushik | B66B 13/24 |
| 2019/0010021 | A1* | 1/2019 | Sarkar | B66B 5/0037 |
| 2019/0277200 | A1 | 9/2019 | Mistry | |
| 2019/0382238 | A1* | 12/2019 | Witczak | B66B 5/0018 |
| 2020/0010211 | A1 | 1/2020 | Eburderie | |
| 2020/0062542 | A1* | 2/2020 | Sudi | G05B 19/4067 |
| 2020/0180905 | A1 | 6/2020 | Witczak et al. | |

FOREIGN PATENT DOCUMENTS

| | | | |
|---|---|---|---|
| CN | 104773625 | A | 7/2015 |
| CN | 204689294 | U | 10/2015 |
| CN | 107010505 | A | 8/2017 |
| CN | 206735561 | U | 12/2017 |
| CN | 108439114 | A | 8/2018 |
| CN | 108715386 | A | 10/2018 |
| EP | 3190075 | A1 | 12/2016 |
| EP | 3260687 | A1 | 12/2017 |
| JP | 2003112862 | A | 4/2003 |
| JP | 2009096562 | A | 5/2009 |
| JP | 2010202335 | A | 9/2010 |
| JP | 2012184115 | A | 9/2012 |
| JP | 2015168560 | A | 9/2015 |
| KR | 101277486 | B1 | 6/2013 |

OTHER PUBLICATIONS

EP Application No. 19205202.5 Extended EP Search Report dated Mar. 27, 2020, 6 pages.

* cited by examiner

VIBRATION MONITORING BEACON MODE DETECTION AND TRANSITION

CROSS-REFERENCE TO RELATED APPLICATIONS

This application is a divisional of U.S. patent application Ser. No. 16/210,147, filed Dec. 5, 2018, the content of which is incorporated by reference herein in its entirety.

BACKGROUND

The embodiments herein relate to sensor systems, and more particularly to vibration monitoring beacon mode detection and transition management for conveyance systems.

Battery-operated sensors have a limited lifespan before servicing is needed to replace battery power. Some battery-operated sensors are in locations that are restricted or challenging to access, such as, mounted to a conveyance system. Two-way communication can consume significant battery power through input monitoring and/or power for two-way communication interfaces.

Further, with respect to elevator systems, monitoring systems, such as elevator monitoring systems, may have limited information available to track the position of an elevator car in a hoistway. For instance, it is possible for reference information to be lost during a power failure or a maintenance override action such that upon recovery, the position of the elevator car within the hoistway (e.g., a floor number) is not readily known. Inaccurate position tracking can hinder predictive maintenance, reduce functionality, and/or result in other effects.

BRIEF SUMMARY

According to an embodiment, a method includes monitoring a plurality of vibration data by a vibration monitoring beacon. The method can also include determining that the vibration monitoring beacon has been installed at a service location based on detecting an installation characteristic signature in the vibration data.

In addition to one or more of the features described herein, or as an alternative, further embodiments include transitioning the vibration monitoring beacon into a learning mode based on determining that the vibration monitoring beacon has been installed at the service location, and monitoring for a learning mode termination event.

In addition to one or more of the features described herein, or as an alternative, further embodiments include transitioning the vibration monitoring beacon from the learning mode to a normal operation mode based on detecting the learning mode termination event.

In addition to one or more of the features described herein, or as an alternative, further embodiments include where the installation characteristic signature comprises one or more spikes greater than a threshold level followed by a normal operating signature in the vibration data.

In addition to one or more of the features described herein, or as an alternative, further embodiments include where the normal operating signature includes an elevated velocity in an expected direction of travel and within an expected range of variation.

In addition to one or more of the features described herein, or as an alternative, further embodiments include where the learning mode termination event includes one or more of detecting completion of a range of travel and a timeout period.

In addition to one or more of the features described herein, or as an alternative, further embodiments include comparing the vibration data in the normal operation mode to one or more characteristic signatures associated with one or more locations based on one or more of: a time domain analysis, a frequency domain analysis, and a sequence analysis, and reverting to the learning mode based on determining that the vibration monitoring beacon is in an unknown state responsive to the comparing.

In addition to one or more of the features described herein, or as an alternative, further embodiments include where the learning mode includes a higher sampling frequency than the normal operation mode, and an output heartbeat rate of the vibration monitoring beacon differs between the learning mode and the normal operation mode.

In addition to one or more of the features described herein, or as an alternative, further embodiments include outputting a vibration signature based on the vibration data to one or more of: a service system and an analysis system, where the vibration monitoring beacon is configured to establish a one-way communication transmission to one or more of: the service system and the analysis system absent a communication reception capability at the vibration monitoring beacon.

In addition to one or more of the features described herein, or as an alternative, further embodiments include where the service location comprises an elevator car door.

According to an embodiment, a system includes one or more vibration sensors and a vibration monitoring beacon operably coupled to the one or more vibration sensors. The vibration monitoring beacon includes a processing system configured to perform monitoring a plurality of vibration data and determining that the vibration monitoring beacon has been installed at a service location based on detecting an installation characteristic signature in the vibration data.

Technical effects of embodiments of the present disclosure include mode detection and transition management for a vibration monitoring beacon absent direct user input or communication.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
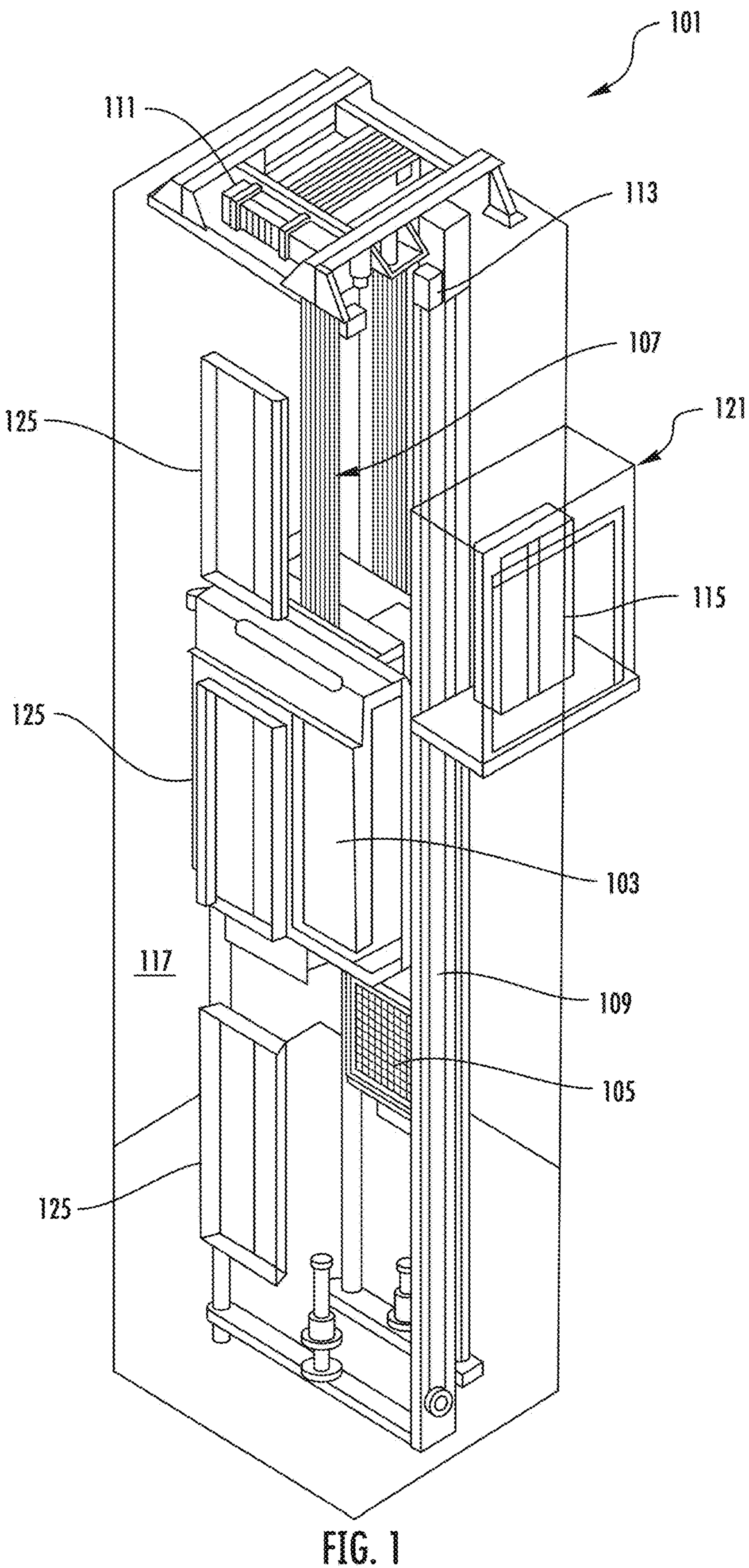
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes. In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
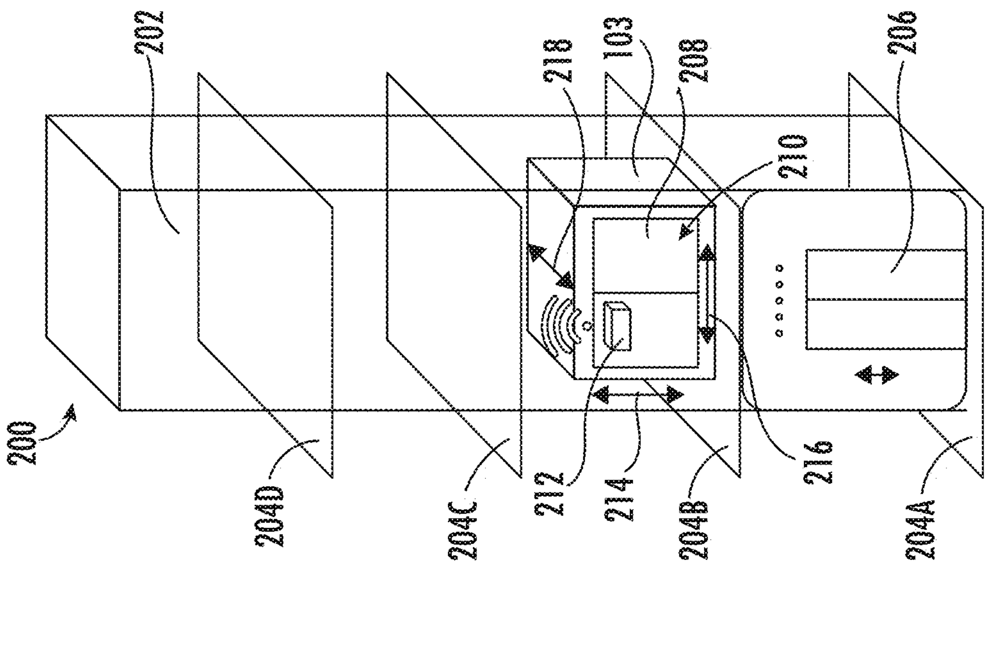
FIG. 2 is a schematic illustration of an elevator system with a monitoring system in accordance with an embodiment of the disclosure.

As shown in FIG. 2, an elevator system 200 with a monitoring system is illustrated, in accordance with an embodiment of the present disclosure. The elevator system 200 is an example of an embodiment of the elevator system 101 of FIG. 1. As seen in FIG. 2, a hoistway 202 includes a plurality of landings 204A, 204B, 204C, 204D (e.g., landings 125 of FIG. 1), which may be located at separate floors of a structure, such as a building. Although the example of FIG. 2 depicts four landings 204A-204D, it will be understood that the hoistway 202 can include any number of landings 204A-204D. Elevator car 103 is operable to travel in the hoistway 202 and stop at landings 204A-204D for loading and unloading of passengers and/or various items. Each of the landings 204A-204D can include at least one elevator landing door 206, and the elevator car 103 can include at least one elevator car door 208. The elevator car doors 208 typically operate in combination with the elevator landing doors 206, where the combination is referred to as one or more elevator doors 210.

Figure 3:
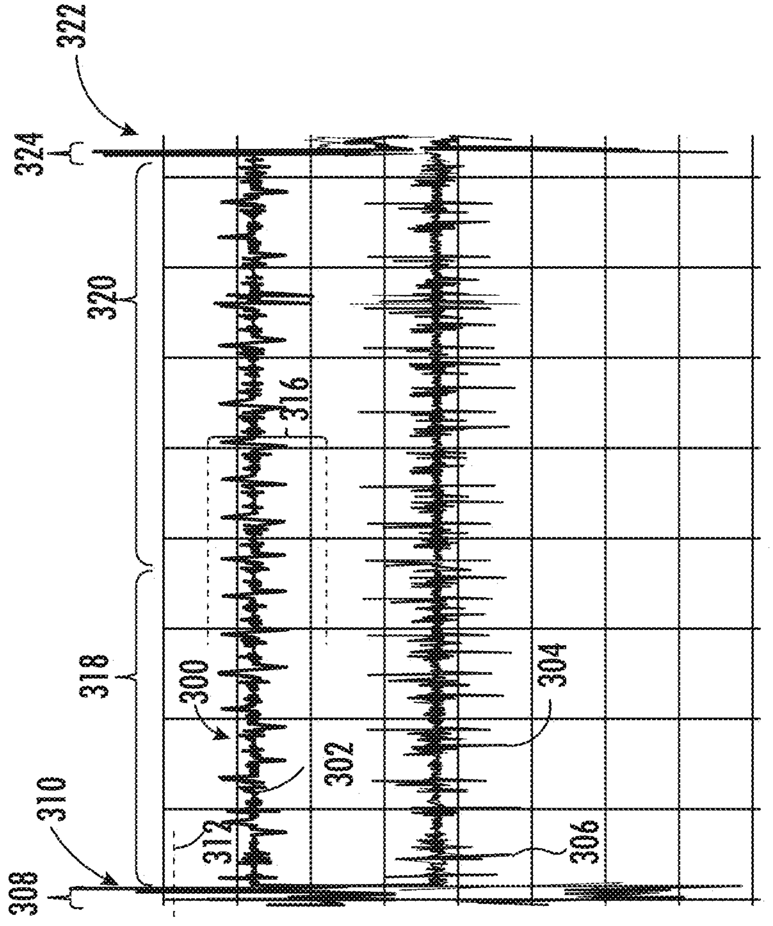
FIG. 3 is a plot of a vibration data that may result from data collection in accordance with an embodiment of the disclosure.

A vibration monitoring beacon 212 can be operably coupled to the elevator car 103 to monitor vibration and movement of the elevator car 103 in the hoistway 202. Vibration monitoring can be used to check for current maintenance issues, predict maintenance issues, and monitor acceleration, velocity, and position data, such as determining whether the elevator car 103 is at one of the landings 204A-204D or positioned between two of the landings 204A-204D. The vibration monitoring beacon 212 is configured to gather vibration data that may be associated with the elevator car 103 in the hoistway 202 and/or movement of a component of the elevator system 200, such as movement of one or more elevator doors 210 (e.g., vibration associated with door opening/closing). The vibration data can be collected along one or more axis, for instance, to observe vibration along an axis of motion of the one or more elevator doors 210 and vibration during vertical travel of the elevator car 103 in the hoistway 202 (e.g., up/down vibration 214, side-to-side vibration 216, front/back vibration 218). An example plot 300 of vibration data is depict in FIG. 3, where vibration signature data 302 correlates to up/down vibration 214, vibration signature data 304 correlates to side-to-side vibration 216, and vibration signature data 306 correlates to front/back vibration 218.

The vibration monitoring beacon 212 can be held in the hand of a technician (not depicted) after power-up but prior to installation on a service location of the elevator car 103, such as mounting on elevator car door 208. Prior to installation, movement by hand can result in irregular vibration data atypical of normal operation vibrations of the vibration monitoring beacon 212 when attached to the elevator car 103. Examples can include too little vibration detected, such as when the vibration monitoring beacon 212 is placed on a static surface, e.g., a table or the ground. Further, axis readings may be atypical when, for example, the vibration monitoring beacon 212 is propped against a surface before installation, such that expected characteristics do not align with the observed results on each axis, e.g., up/down vibrations 214 appear on an axis associated with side-to-side vibration 216 or front/back vibration 218. Other movement of the vibration monitoring beacon 212 prior to installation can also appear atypical of normal operation vibrations. In some embodiments, the vibration monitoring beacon 212 can be in a waiting-for-installation mode 308 prior to detecting an installation characteristic signature 310 in the vibration data, such as one or more spikes greater than a threshold level 312. As further confirmation, the installation characteristic signature 310 can be confirmed as a sequence of one or more spikes greater than the threshold level 312 followed by a normal operating signature 314 in the vibration data (e.g., in the vibration signature data 302). The one or more spikes may be characteristic of the vibration monitoring beacon 212 being latched or snapped into place, particular where magnetic coupling is used. The normal operating signature 314 may be characterized by vibration content at expected frequencies and within an expected range of variation 316 with respect to amplitude, frequency, and/or phase.

The vibration monitoring beacon 212 may transition from the waiting-for-installation mode 308 into a learning mode 318 based on determining that the vibration monitoring beacon 212 has been installed at the service location (e.g., on the elevator car 103). The learning mode 318 (also referred to as commissioning mode) can be used to learn baseline data about the current environment of the vibration monitoring beacon 212. For instance, the vibration monitoring beacon 212 can monitor for vibrations characteristic at each of the landings 204A-204D, positions of the landings 204A-204D within the hoistway 202, characteristics of vibrations between landings 204A-204D, typical vibration of elevator doors 210, acceleration profiles, total travel between landings 204A and 204D, and other such values. The vibration monitoring beacon 212 may have different operating parameters during the learning mode 318, such as operating at a higher sampling frequency than during a normal operation mode 320 and producing an output heartbeat rate that differs between the learning mode 318 and the normal operation mode 320. The output heartbeat rate can refer to how often status messages and/or data are transmitted from the vibration monitoring beacon 212. Further, message formatting and content may differ between the learning mode 318 and the normal operation mode 320. Another transition factor from learning mode 318 to the normal operation mode 320 can be a timeout period. For instance, rather than tracking movement of the elevator car 103 between the landings 204A-204D to determine when the learning mode 318 is complete, the learning mode 318 can remain engaged for a predetermined time period, e.g., 30 minutes, 12 hours, one day, multiple days, etc. to ensure that a sufficiently broad range of conditions were likely observed such that variations can be detected after transitioning to the normal operation mode 320.

In some embodiments, the vibration monitoring beacon 212 can continue to monitor for events, such as one or more spikes 322 indicative of a mode transition, such as a detached mode 324, as a transition from normal operation mode 320. For instance, similar monitoring that is performed for the waiting-for-installation mode 308 may be performed during the normal operation mode 320 to determine whether to transition into the detached mode 324. The detached mode 324 may indicate that servicing is being performed or an individual is tampering with the vibration monitoring beacon 212. The detached mode 324 can behave similarly to the waiting-for-installation mode 308 by monitoring for a transition to the learning mode 318. The detached mode 324 may be distinguished from the waiting-for-installation mode 308 in that normal operation mode 320 was previously achieved, and some baseline data from a previous iteration of the learning mode 318 can be retained, for instance, to transition to the normal operation mode 320 faster than in waiting-for-installation mode 308.

The vibration monitoring beacon 212 may also transition from the normal operation mode 320 back to the learning mode 318, for example, based on determining that the vibration monitoring beacon 212 is in an unknown state. An unknown state may occur where vibrations expected at particular positions within the hoistway 202 or at landings 204A-204D do not occur as expected. As an example, some landings 204A-204D may have elevator landing doors 206 on different sides of the hoistway 202 (e.g., a front door and/or a back door). When the elevator car doors 208 are detected as opening, based on vibration data, at locations which are not expected to have corresponding elevator landing doors 206 after learning mode 318 is completed, an unknown state may be achieved where further learning or relearning is needed.

Figure 4:
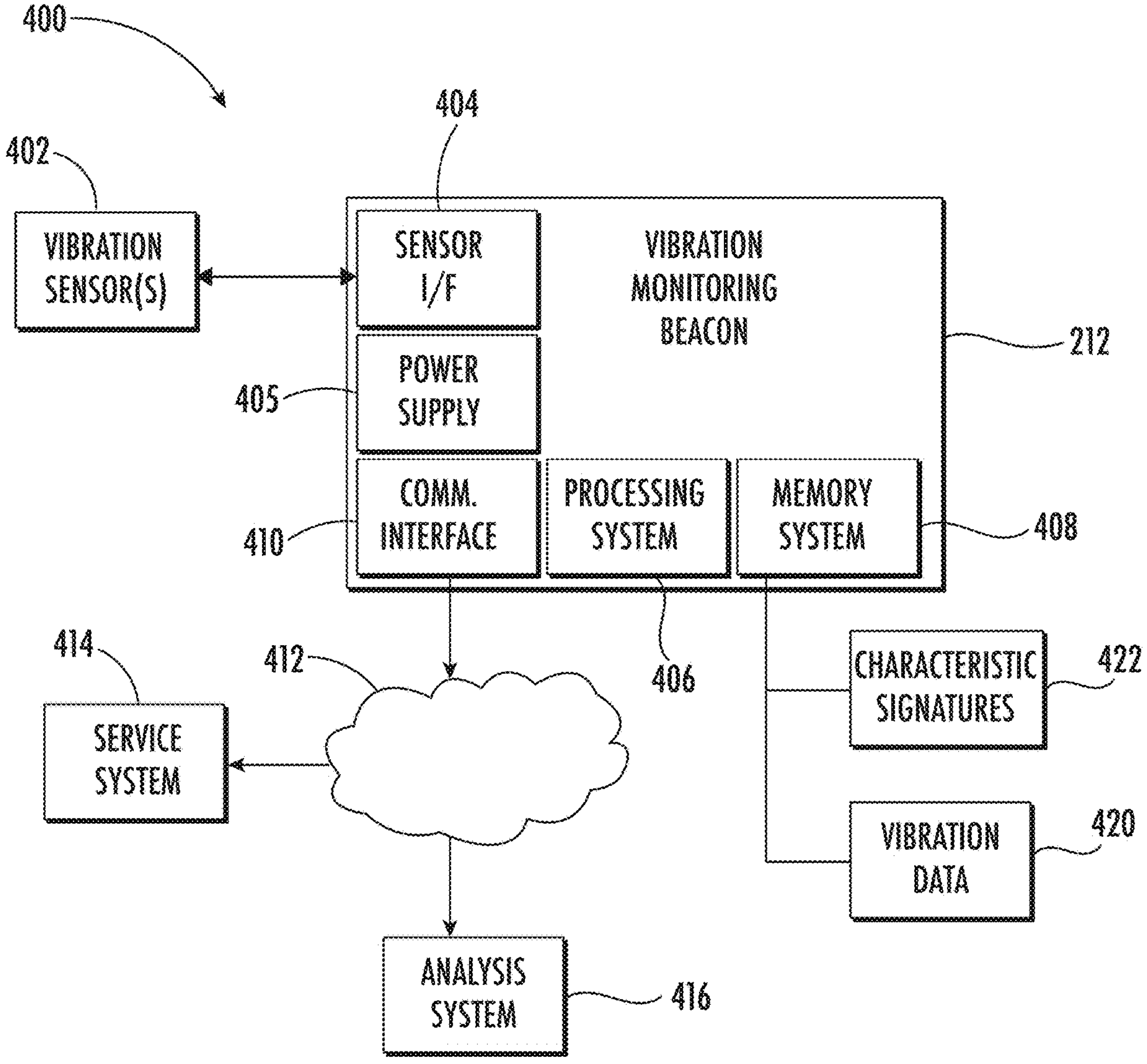
FIG. 4 is a block diagram of a vibration monitoring system in accordance with an embodiment of the disclosure.

FIG. 4. depicts an example of a vibration monitoring system 400 that includes the vibration monitoring beacon 212 of FIG. 2 operably coupled to one or more vibration sensors 402, for instance, through a sensor interface 404. The sensor interface 404 may provide signal conditioning such as filtering, gain adjustment, analog-to-digital conversion, and the like. The sensor interface 404 may interface with other types of sensors (not depicted), such as pressure sensors, humidity sensors, microphones, and other such sensors. In embodiments, the vibration monitoring beacon 212 does not have access to global positioning sensor information and uses the one or more vibration sensors 402 to determine a position of the elevator car 103 within the hoistway 202 of FIG. 2 based at least in part on vibration data 420. The vibration data 420 can also be used to determine a likely current state of the vibration monitoring beacon 212, such as installed in a service location (e.g., coupled to the elevator car 103) or not installed. The vibration data 420 can also be used to determine when to transition between waiting-for-installation mode 308, learning mode 318, normal operation mode 320, detached mode 324 of FIG. 3 and/or other modes (not depicted). The vibration data 420 can be used to identify a variety of features associated with the elevator doors 210, landings 204A-204D, hoistway 202, and other such information as characterized in characteristic signatures 422.

The vibration monitoring beacon 212 can also include a power supply 405, processing system 406, a memory system 408, and a communication interface 410 among other interfaces (not depicted). The power supply 405 can include a battery, a supercapacitor, an ultracapacitor, and/or other energy storage technology known in the art. Alternatively, the power supply 405 can include a continuous power source. When embodied with a storage-based power source, power supplied by the power supply 405 can be time limited such that efficient processing and communication may be used to extend stored energy reserve lifespan. Energy management can include limiting active times of the processing system 406, memory system 408 and/or communication interface 410. As one example, the update rates of processing performed by the processing system 406 may change depending on the mode of operation, where a higher update rate is used during the learning mode 318 for higher fidelity characterization, and a lower update rate is used during normal operation mode 320 to conserve energy of the power supply 405.

The processing system 406 can include any number or type of processor(s) operable to execute instructions. For example, the processing system 406 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 408 may be a storage device such as, for example, a random access memory (RAM), read only memory (ROM), or other electronic, optical, magnetic or any other computer readable storage medium. The memory system 408 is an example of a tangible storage medium readable by the processing system 406, where software is stored as executable instructions for execution by the processing system 406 to cause the vibration monitoring system 400 to operate as described herein. The memory system 408 can also store various types of data such as vibration data 420 acquired from the one or more vibration sensors 402 and characteristic signatures 422 to support classification of the vibration data 420, which can be performed locally, cloud-based, or otherwise distributed between one or more components.

The communication interface 410 can establish and maintain connectivity over a network 412 using wired and/or wireless links (e.g., Internet, cellular, Wi-Fi, Bluetooth, Z-Wave, ZigBee, etc.) with one or more other systems, such as a service system 414, an analysis system 416, and/or to access various files and/or databases (e.g., software updates). The service system 414 can be a device used by a mechanic or technician to support servicing of the elevator system 200 of FIG. 2. The analysis system 416 can be part of a predictive maintenance system that correlates various sources of data associated with operation of the elevator system 200, such as position information of the elevator car 103 of FIG. 2, to track system health, predict issues, and schedule preventive maintenance actions, which can be performed locally, cloud-based, or otherwise distributed between one or more components. In some embodiments, the communication interface 410 can be implemented as a one-way, transmit-only interface to conserve power of the power supply 405. For instance, the communication interface 410 can transmit wirelessly using Bluetooth low energy (BLE) to a gateway of the network 412, which further distributes data to the service system 414, an analysis system 416, and/or to access various files and/or databases. Establishing a one-way communication transmission (e.g., a transmit-only radio) to one or more of the service system 414 and the analysis system 416 absent a communication reception capability at the vibration monitoring beacon 212 may enable extended life of energy storage capacity of the power supply 405.

Figure 5:
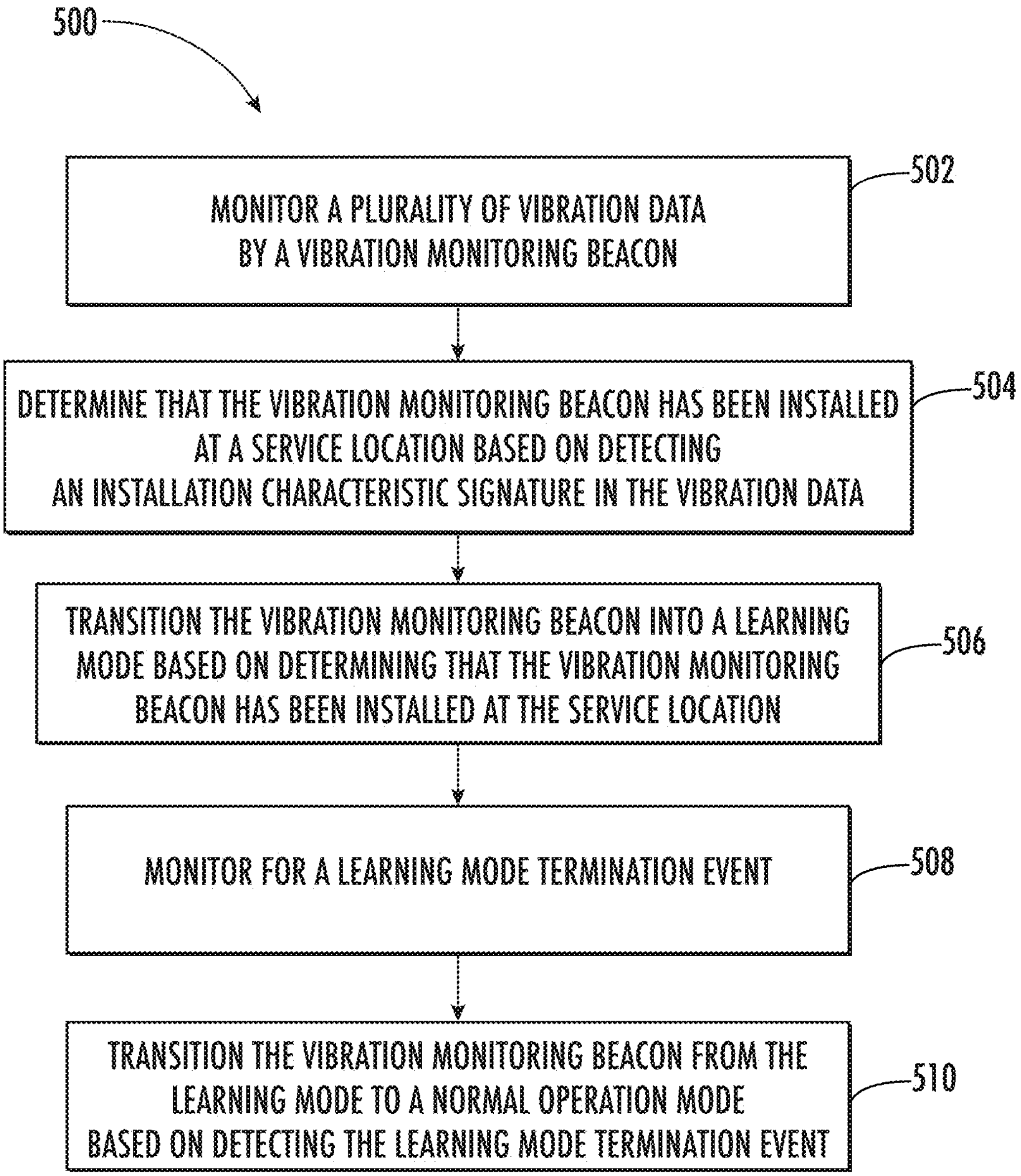
FIG. 5 is a flow chart of a method in accordance with an embodiment of the disclosure.

Referring now to FIG. 5, while referencing FIGS. 1-4, FIG. 5 shows a flow chart of a method 500 in accordance with an embodiment of the disclosure. At block 502, the vibration monitoring beacon 212 monitors a plurality of vibration data 420 that may be associated with an elevator car 103 at a plurality of landings 204A-204D in a hoistway 202. At block 504, the vibration monitoring beacon 212 can determine that the vibration monitoring beacon 212 has been installed at a service location based on detecting an installation characteristic signature in the vibration data 420. For example, the characteristic signatures 422 can define an installation characteristic signature 310 as including one or more spikes greater than a threshold level 312 followed by a normal operating signature 314 in the vibration data 420. Various features can be observed to distinguish between events associated with attachment/installation versus high g-force events occurring during operation (e.g., a sudden acceleration, emergency stop, malfunction, or adjustment). As an example, in the context of an elevator system, an attachment and commissioning event may be identified based on a combination of shifting in direction of gravity and transitioning to a stable vibration profile after a high acceleration event occurs (e.g., relative to one or more thresholds). For instance, a usual installation method may result detecting a high acceleration event perpendicular to gravity followed by a substantial reduction in acceleration after an adjustment period (e.g., after about three seconds). If magnets are used during installation, a high acceleration event (e.g., >300 milli-g) may be detected due to increased pulling force of the magnets when approaching a ferromagnetic (e.g., steel) mounting surface. Magnets integrated with the vibration monitoring beacon 212 can be pulled with an increasing speed followed by a rapid stop when reaching the mounting surface.

At block 506, the vibration monitoring beacon 212 can transition into a learning mode 318 based on determining that the vibration monitoring beacon 212 has been installed at the service location, such as mounted on the elevator car door 208 with an expected orientation. During learning mode 318, the elevator car 103 may travel to a number of predetermined locations, such as traveling to and stopping at each of the landings 204A-204D while monitoring the one or more vibration sensors 402. Alternatively, the learning mode 318 can be unstructured with observations made for a number of events or a period of time. The collection of vibration data 420 can include detection of vibrations associated with movement of at least one elevator door 210. For instance, the at least one elevator door 210 can be opened and closed at one or more of the landings 204A-204D during the learning mode 318 to establish a calibration set of vibration data 420. Since the vibration characteristics of the elevator system 200 may change over time, the vibration monitoring beacon 212 can support updating the calibration set of vibration data 420 for the elevator car 103 at the landings 204A-204D in the hoistway 202, for instance, if the vibration monitoring beacon 212 reached an unknown state.

At block 508, the vibration monitoring beacon 212 can monitor for a learning mode 318 termination event, such as detecting completion of a range of travel (e.g., between landings 204A-204D) or a timeout period. In some embodiments, the termination event can be defined in the characteristic signatures 422.

At block 510, the vibration monitoring beacon 212 can transition from the learning mode 318 to the normal operation mode 320 based on detecting the learning mode termination event. In the normal operation mode 320, the vibration monitoring beacon 212 can compare the vibration data 420 to one or more characteristic signatures 422 associated with one or more locations based on one or more of: a time domain analysis, a frequency domain analysis, and a sequence analysis. The vibration monitoring beacon 212 can revert to the learning mode 318 based on determining that the vibration monitoring beacon 212 is in an unknown state responsive to the comparing. The learning mode 318 can include a higher sampling frequency than the normal operation mode 320, and an output heartbeat rate of the vibration monitoring beacon 212 can differ between the learning mode 318 and the normal operation mode 320.

The characteristic signatures 422 may be defined and determined using one or more analysis techniques, such as one or more of a time domain analysis, a frequency domain analysis, and a sequence analysis. The time domain analysis can include monitoring for waveform shapes, peaks, phase relationships, slopes, and other such features. Time domain analysis may be performed based on data acquired from the one or more vibration sensors 402 and can include time-based correlations with other data sources, such as audio data, pressure data, and the like. Frequency domain analysis can include performing a domain transform, such as a Fast Fourier Transform, a Wavelet Transform, and other such known transforms, based on time domain data collected from the one or more vibration sensors 402. Frequency domain analysis can be used to examine frequency, magnitude, and phase relationships. Time domain analysis can be used to localize data sets in time, for instance, where a rise in root-mean-square (RMS) occurs during a segment of time, the corresponding segment can be provided for frequency domain analysis. Sequence analysis can include identifying a combination of events or signatures to create a more complex signature. For instance, sequence analysis may include identifying a combination of vibration data 420 collected as the elevator car 103 transitions between two of the landings 204A-204D and vibration data 420 collected at one of the landings 204A-204D corresponding to an elevator door 210 movement. Squeaks, rattles, bumps, imbalances, and other such variations may be localized and repeatable at various positions in the elevator system 200, which can be captured as the characteristic signatures 422.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:

monitoring a plurality of vibration data by a vibration monitoring beacon;

determining that the vibration monitoring beacon has been installed at a service location based on detecting an installation characteristic signature in the vibration data;

transitioning the vibration monitoring beacon into a learning mode based on determining that the vibration monitoring beacon has been installed at the service location; and monitoring for a learning mode termination event, wherein the learning mode termination event comprises one or more of detecting completion of a range of travel and a timeout period.

2. The method of claim 1, wherein the installation characteristic signature comprises one or more spikes greater than a threshold level followed by a normal operating signature in the vibration data.

3. The method of claim 2, wherein the normal operating signature comprises an elevated velocity in an expected direction of travel and within an expected range of variation.

4. The method of claim 2, further comprising:

comparing the vibration data in the normal operation mode to one or more characteristic signatures associated with one or more locations based on one or more of: a time domain analysis, a frequency domain analysis, and a sequence analysis.

5. The method of claim 4, further comprising:

reverting to the learning mode based on determining that the vibration monitoring beacon is in an unknown state responsive to the comparing.

6. The method of claim 2, wherein the learning mode comprises a higher sampling frequency than the normal operation mode, and an output heartbeat rate of the vibration monitoring beacon differs between the learning mode and the normal operation mode.

7. The method of claim 1, further comprising:

outputting a vibration signature based on the vibration data to one or more of: a service system and an analysis system.

8. The method of claim 7, wherein the vibration monitoring beacon is configured to establish a one-way communication transmission to one or more of: the service system and the analysis system absent a communication reception capability at the vibration monitoring beacon.

9. The method of claim 1, wherein the service location comprises an elevator car door.

10. A system comprising:

one or more vibration sensors; and a vibration monitoring beacon operably coupled to the one or more vibration sensors, the vibration monitoring beacon comprising a processing system configured to perform:

monitoring a plurality of vibration data; and determining that the vibration monitoring beacon has been installed at a service location based on detecting an installation characteristic signature in the vibration data, wherein the installation characteristic signature comprises one or more spikes greater than a threshold level followed by a normal operating signature in the vibration data.

11. The system of claim 10, wherein the processing system is configured to perform:

transitioning the vibration monitoring beacon into a learning mode based on determining that the vibration monitoring beacon has been installed at the service location;

and monitoring for a learning mode termination event.

12. The system of claim 11, wherein the processing system is configured to perform:

transitioning the vibration monitoring beacon from the learning mode to a normal operation mode based on detecting the learning mode termination event.

13. The system of claim 12, wherein the learning mode termination event comprises one or more of detecting completion of a range of travel and a timeout period.

14. The system of claim 12, wherein the processing system is configured to perform:

comparing the vibration data in the normal operation mode to one or more characteristic signatures associated with one or more locations based on one or more of: a time domain analysis, a frequency domain analysis, and a sequence analysis; and reverting to the learning mode based on determining that the vibration monitoring beacon is in an unknown state responsive to the comparing.

15. The system of claim 12, wherein the learning mode comprises a higher sampling frequency than the normal operation mode, and an output heartbeat rate of the vibration monitoring beacon differs between the learning mode and the normal operation mode.

16. The system of claim 10, wherein the normal operating signature comprises an elevated velocity in an expected direction of travel and within an expected range of variation.

17. The system of claim 10, wherein the service location comprises an elevator car door.

18. A system comprising:

one or more vibration sensors; and a vibration monitoring beacon operably coupled to the one or more vibration sensors, the vibration monitoring beacon comprising a processing system configured to perform:

monitoring a plurality of vibration data;

determining that the vibration monitoring beacon has been installed at a service location based on detecting an installation characteristic signature in the vibration data; and outputting a vibration signature based on the vibration data to one or more of: a service system and an analysis system, wherein the vibration monitoring beacon is configured to establish a one-way communication transmission to one or more of: the service system and the analysis system absent a communication reception capability at the vibration monitoring beacon.

19. The system of claim 18, wherein the installation characteristic signature comprises one or more spikes greater than a threshold level followed by a normal operating signature in the vibration data.

* * * * *